US005193190A

United States Patent [19]
Janczyn et al.

[11] Patent Number: 5,193,190
[45] Date of Patent: Mar. 9, 1993

[54] PARTITIONING OPTIMIZATIONS IN AN OPTIMIZING COMPILER

[75] Inventors: Joyce M. Janczyn, Toronto, Canada; Peter W. Markstein, Austin, Tex.

[73] Assignee: International Business Machines Corporation, Armonk, N.Y.

[21] Appl. No.: 371,487

[22] Filed: Jun. 26, 1989

[51] Int. Cl.$^5$ .............................................. G06F 9/45
[52] U.S. Cl. .............................. 395/700; 364/DIG. 1; 364/280.4; 364/280.5
[58] Field of Search .................. 364/200, 900, DIG. 1, 364/DIG. 2; 395/700

[56] References Cited

U.S. PATENT DOCUMENTS

| 4,435,753 | 3/1984 | Rizzi | 364/200 |
| 4,506,325 | 3/1985 | Bennett et al. | 364/200 |
| 4,567,574 | 1/1986 | Saadé et al. | 364/900 |
| 4,571,678 | 2/1986 | Chaitin | 364/200 |
| 4,642,764 | 2/1987 | Auslander et al. | 364/200 |
| 4,642,765 | 2/1987 | Cocke et al. | 364/200 |
| 4,656,582 | 4/1987 | Chaitin et al. | 364/200 |
| 4,656,583 | 4/1987 | Auslander et al. | 364/200 |
| 4,773,007 | 9/1988 | Kanada et al. | 364/200 |
| 4,782,444 | 11/1988 | Munshi et al. | 364/200 |
| 4,953,084 | 8/1990 | Meloy et al. | 364/200 |
| 4,961,141 | 10/1990 | Hopkins et al. | 364/200 |

OTHER PUBLICATIONS

Gries, D., *Compiler Construction for Digital Computers*, pp. 375–411 (1971).

J. T. Schwartz, "On Programming" An Interim Report on the SETL Language. Installment II: The SETL Language and Examples of its Use, Courant Institute of Math Sciences, NYU 1973, pp. 293–310.

E. Morel and C. Renvoise, "Global Optimization by Suppression of Partial Redundancies", CACM, vol. 22, No. 2, pp. 96–103, 1979.

A. Aho and J. Ullman, "Principles of Compiler Design", Addison Wesley, 1977, pp. 13–19, 406–477.

*Proceedings of the Sigplan Symposium on Compiler Construction*, vol. 14, No. 8, Aug. 6, 1979, Denver, US, pp. 214–220, J. E. Ball, "Predicting the Effects of Optimization on a Procedure Body (Program Compilers)", the whole document.

*Decus Proceedings of the Spring Symposium*, May 12, 1969, Wakefield, US, pp. 103–104, D. R. Donati et al, "Techniques for Compiling Large Fortran Programs for PDP-9 Computer", p. 103, column 2, line 11–p. 104, column 1, line 12.

*Hewlett-Packard Journal*, vol. 37, No. 1, Jan. 1986, pp. 4–18, D. S. Coutant et al, "Compilers for the New Generation of Hewlett-Packard Computers", p. 6–p. 7, section Components of the Optimizer, p. 10, column 1, line 54 p. 10, column 2, line 13.

*Primary Examiner*—David L. Clark
*Assistant Examiner*—Matthew C. Fagan
*Attorney, Agent, or Firm*—Douglas H. Lefeve

[57] ABSTRACT

A computer program to be compiled is optimized prior to carrying out the final compilation. Subgraphs within the program are identified and examined for optimization beginning with the entire program as the largest subgraph. The number of entities in each subgraph which are relevant to each dimension of arrays used to represent data flow equations is determined. Next, the amount of memory required to contain the arrays is determined. If that memory requirement is within a predefined memory usage limit for the compilation, then a specified procedure of the compilation process is applied. If the memory requirement to contain the arrays exceeds the predefined memory usage limit for the compilation, the process is repeated for successively smaller subgraphs within the program in an attempt to find a subgraph to which the memory limits allow application of the specified procedure.

7 Claims, 2 Drawing Sheets

PARTITIONING OPTIMIZATIONS IN AN OPTIMIZING COMPILER

This invention relates to the improvement of the optimizing process in an optimizing complier. More particularly, it relates to a method for preventing the optimization process from being abandoned because of lack of memory space when compiling large programs in optimizing compilers that use global optimization algorithms (herein called "specified procedures") to improve the quality of the code that they generate.

BACKGROUND OF THE INVENTION

Optimizing compilers are important tools for programmers to improve the effectiveness and efficiency of the target CPU. The goal of an optimizing compiler is to generate the smallest and fastest set of object code possible that exactly duplicates the function of the program as it was written. In order to generate compact and efficient object code for computer programs written in high level languages, compilers used for such languages must utilize sophisticated global optimizers which generally use various specified procedures for reducing the run time or the memory requirements of a program. For example, a compiler may perform any or all of: common sub-expression elimination, code motion, strength reduction (replacing a slow operation by an equivalent fast operation), store motion and removing useless code sequences. Descriptions of some of these optimizations can be found in:

- J. T. Schwartz, On Programming—An Interim Report on the SETL Language. Installment II: The SETL Language and Examples of its Use, Courant Institute of Math Sciences, NYU, 1973, pp. 293-310.
- E. Morel and C. Renvoise, Global Optimization by Suppression of Partial Redundancies, CACM, Vol. 22, No. 2, pp. 96-103, 1979.
- A. Aho and J. Ullman, Principles of Compiler Design, Addison-Wesley, 1977.

Each of these optimizing specified procedures transforms an intermediate language (IL) program into a semantically equivalent but more efficient IL program. Intermediate level language, as its name implies, is between a high level source program and machine code in complexity and sophistication. An intermediate level language can be especially useful in preparing compilers that are to be capable of translating any of several high level languages into machine code targetted to any of several machines; it reduces markedly the number of products that must be developed to cover a wide range of both machine types and programming languages, because all may translate through a common intermediate level language. It is at the intermediate language level that most optimizations are commonly performed.

The most important optimizations in an optimizing compiler are carried out globally, that is, on a program-wide level, rather than on a localized or basic block level. In performing each of these optimizations, a series of data flow equations must be solved. In doing so, the compiler gathers information about the expressions in the program being compiled; such information is dependent upon the flow of control in the program. For its own unique code transformation, each optimization must have a method of tracking when and how any given expression is available throughout the program as compiled.

This information is derived from the control flowgraph which is a directed graph depicting the possible execution paths of the program. In a low order flowgraph, the nodes represent basic blocks of a program and these are connected by directed edges representing paths along which control in the program flows. In a high order flowgraph the nodes are comprised of basic blocks and/or strongly connected regions.

In the present specification, the term "basic block" means any set of instructions in a computer program, whether object or source code, which is a straight-line sequence of code into which branches reach only its first instruction, and from which control leaves the basic block only after the last instruction.

The term "strongly connected region" means a set of nodes among which there is a path that can be repeatedly followed by the program control without passing through a node outside the region. Strongly connected regions are well known in the art of compiler design. A "single entry strongly connected region" is a strongly connected region that has only one node that is reached from outside the single entry strongly connected region. Hereafter in this disclosure, the term "region" means a single entry strongly connected region.

The term "subgraph" means any combination of nodes within the flowgraph. All strongly connected regions are also subgraphs, but not all subgraphs are strongly connected regions.

The term "entities" refers to the components of an intermediate representation which are used to describe a program as it is being compiled. These include variable entries, dictionary entries, results, expressions, instructions, and basic blocks of a program.

The larger and more complex a program is, the larger and more convoluted is its flowgraph, the greater the number of calculations involved and the greater the number of expressions for which dataflow equations must be solved. Memory requirements and processing time for the compilation tend to increase quadratically as a function of source program size for global optimization. When a situation arises where the compiler cannot optimize an entire program because of a space restriction, in the past the optimization has had to be abandoned. Attempts have been made to improve the quality of optimizations in the past. A small number of patents has been granted on inventions in this area.

U.S. Pat. No. 4,506,325 discloses a method of decreasing the storage requirements of a compiler by encoding operators and operands using an information theoretic encoding technique, applied to segments of a program. The disclosure does not deal with how a program is segmented.

U.S. Pat. No. 4,571,678 discloses a method of utilizing the limited number of registers in a target computer by improving register allocation procedures. It does not disclose any way of handling large programs that exceed the general memory availability of the target computer.

There remains a need for a program compilation technique that does not simply give up the struggle if an optimization cannot be performed within the constraints of the hardware or computer on which the program is being compiled.

It has now been discovered that the scope on which an optimization is applied can be limited, and yet many of the benefits of optimization can be realized. The program unit can be partitioned on the basis of its control flow structure into sections sufficiently small to be manipulated by the compiler.

BRIEF SUMMARY OF THE INVENTION

Accordingly, the present invention consists in a method, in an optimizing compiler using specified procedures for identifying ways of improving the quality of generated code, for optimizing a program to be compiled comprising, prior to carrying out an actual optimization:

(1) for a specified procedure, developing a control flowgraph representing all possible execution paths for said program;

(2) identifying subgraphs in said program;

(3) performing the steps of:

(a) selecting a subgraph to be examined for optimization, said subgraph on a first iteration being the entire program;

(b) by examining the code sequences in said subgraph, determining the number of entities in said subgraph which are relevant to each dimension of arrays used in said specified procedure to represent data flow equations;

(c) determining the amount of memory required to contain said arrays;

(d) if said amount of memory exceeds a predetermined memory usage limit for said compilation thereby denoting an unsuccessful attempt at optimizing the code in nodes of said subgraph, applying step (e) for said subgraph, otherwise carrying out said specified procedure on said subgraph; and (e) repeating steps (b) to (d) for every subgraph contained within said subgraph for which insufficient storage was found in step (d).

DESCRIPTION OF THE INVENTION

Figure 1:
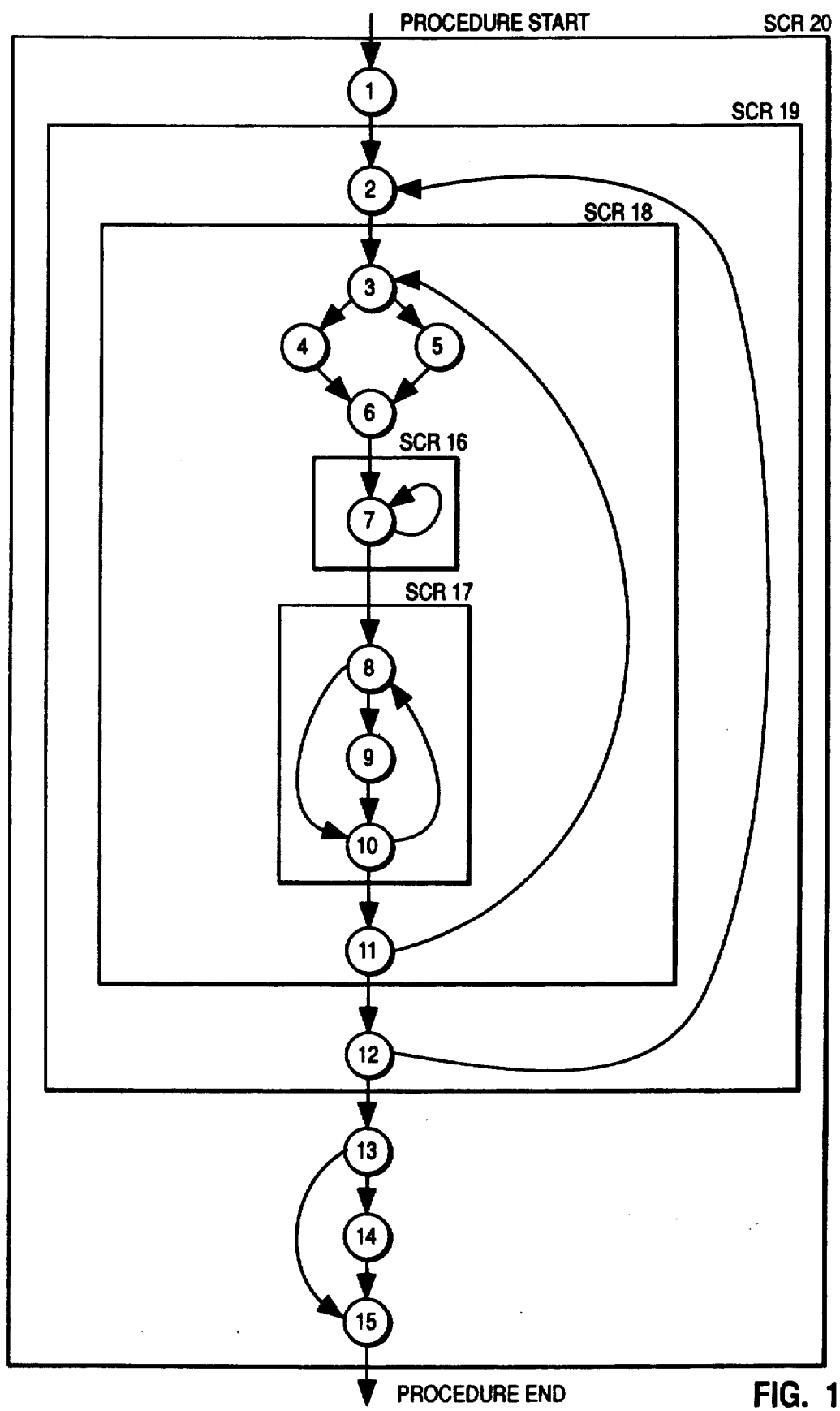
FIG. 1 is a depiction of a typical flowgraph of a portion of a program, as would be built by a compiler according to the invention prior to each optimizing step that is to be performed.

The first step in implementing the method of the invention is to construct a flowgraph of the program to be optimized. Flowgraph construction is well-known in the art and for the purposes of the invention, can be implemented by standard techniques. Then all of the appropriate subgraphs are identified within the flowgraph. The choice of subgraphs depends on the optimization procedure to be performed. Strongly connected regions are often useful, but intervals, hammocks and trees can also be used, and in extremely contained situations, a subgraph can consist of a single node. In the description of a preferred embodiment of the present invention the subgraphs are taken to be the collection of strongly connected regions.

The number and dimensions of arrays to be formed during the optimization must be known in order to write the specified procedure for the particular optimization. Their dimensions will be based upon the quantities of certain entities, for example instructions, results, expressions, dictionary entries, and basic blocks in the code sequence. The particular entities that are produced depend upon the specified procedure being undertaken. These quantities are constant for each subgraph of a program and the amount of memory needed can be easily calculated before the optimization is done. The memory limit that is imposed on the compiler can be pre-defined by the compiler writer at one or more levels or it can be dynamically determined as the compiler assesses the system's resource usage. One reason to constrain the amount of memory available to a selected procedure is also to constrain the execution time of the selected procedure. The memory requirements having been determined for applying the specified procedure to the entire program, the memory requirement is compared with the memory available and if the available memory is sufficient, then the optimization is carried out. If the memory is insufficient, then an attempt is made to apply the specified procedure to each of the maximal individual subgraphs within the subgraph for which there was insufficient space. For each contained subgraph for which there is still insufficient memory available, its contained subgraphs are optimized; if these contained subgraphs cannot be optimized, then each of the contained subgraphs will be further broken down in turn into its contained subgraphs. This iteration continues until a subgraph is examined whose optimization memory requirements are sufficiently small that an optimization can be carried out within the allotted memory, and the optimization is then performed. The method of the invention can be used with one or more optimizations, and when multiple optimizations are performed, they may be performed in any sequence.

An example of a specific optimization is the optimization technique known as common sub-expression elimination and code motion. For this optimization, the subgraphs into which the flowgraph is broken down are the strongly connected regions. One of the sets of data to be computed is the set of expressions that are available at the exit of each basic block and region within the outermost region being optimized (the "avail" set). In this case, two types of entities must be counted to determine the size of the "avail" set: the number of different expressions, and the number of basic blocks and regions including the region being commoned.

The availability information is collected by going through the code in the basic blocks of the outermost region being optimized (i.e. the low order control flowgraph) and marking which expressions are computed and not killed by any subsequent redefinitions of their arguments. These data are then propagated outward through the outer level regions to establish which expressions are available at the exits of every region. After this step, the assumption is made that nothing is available upon entry to the outermost region and this new information is propagated back into the inner regions. The need to process data flow information into and out of the regions of the flowgraph comes from the nature of the loops which comprise the regions. Clearly, common sub-expression elimination benefits from partitioning for large and complicated programs. The processing time for propagating information into and out of the basic blocks and regions of an entire program can be very large, and further, the space requirements of the arrays can be large. By partitioning the program according to the method of the invention, not only the second dimension of the "avail" set, but also its first dimension is affected. In most cases, the universe representing the set of expressions which appear in an inner region is a subset of the universe for the set of expressions found in its outer regions. Thus, by optimizing on the next level of regions in a high order flowgraph, the size of an array can be significantly reduced because it is highly probable that more than one dimension is affected.

DETAILED DESCRIPTION OF THE INVENTION

A preferred embodiment of the invention will now be described with reference to FIG. 1, in which a flowgraph representing a portion of a typical compiled program is shown. In the embodiment illustrated here, the type of subgraph used is the strongly connected region. Nodes 1 through 15 represent basic blocks of one or more lines of code having one entry and one exit point. The entire flowgraph shown in FIG. 1 is a strongly connected region 20; this is defined as being true, even though it does not fit the classical definition because no return path exists from within the flowgraph to node 1.

Searching for the next inner strongly connected region can be done by methods known in the art, and is not critical to the method of the invention. In the present example node 2 has a path returning from node 12, but no return path from any later node. The next inner strongly connected region in the flowgraph is region 19, including nodes 2 through 12. The next contained strongly connected region within region 19 is analyzed similarly. Thus a path can be traced including nodes 3 through 11 repeatedly, and that defines region 18. Similarly, the other two strongly connected regions in the flowgraph of FIG. 1 are region 17, consisting of nodes 8, 9 and 10, and region 16, consisting of node 7 which has its own internal return path. Nodes 13 to 15 do not constitute a strongly connected region because there is no return path within the group of nodes that would permit a repeated flow of control without passing to a node outside the group.

The method of the invention is carried out on the program by, first, building the flowgraph shown in FIG. 1. Then the entire program is tested for an optimization procedure. As the compiler works through the entire program, a count of the entities used by the optimizing procedure is kept, including the number of entities which determine the size of the arrays which represent the data flow equations. As the counts are incremented, the unit size of each dimension of each array is noted and the total number of elements in the array is calculated.

This is then compared with the allotted memory. If the requirements exceed the allotted memory, then the next smaller strongly connected region is found as outlined above, and examined in the same manner. When a region is found that is sufficiently small to enable a successful optimization to be done, the optimization is performed on that region. The control flowgraph may optionally be rebuilt prior to optimizing on other specified procedures.

In some cases, it may be desirable, after a subgraph susceptible of being optimized has been treated, to attempt to optimize a larger subgraph. Since application of the selected procedure has reduced the size of the code in the subgraph to which it was applied, it may now be possible to treat the containing subgraph as a unit. However, such reexamination increases compilation time, whereas the thrust of the invention is to limit the compilation time and space during optimization. If carried out, such a step is performed in the same manner as the previous examination of the code sequences, except that successively higher-level regions are examined in turn.

Figure 2:
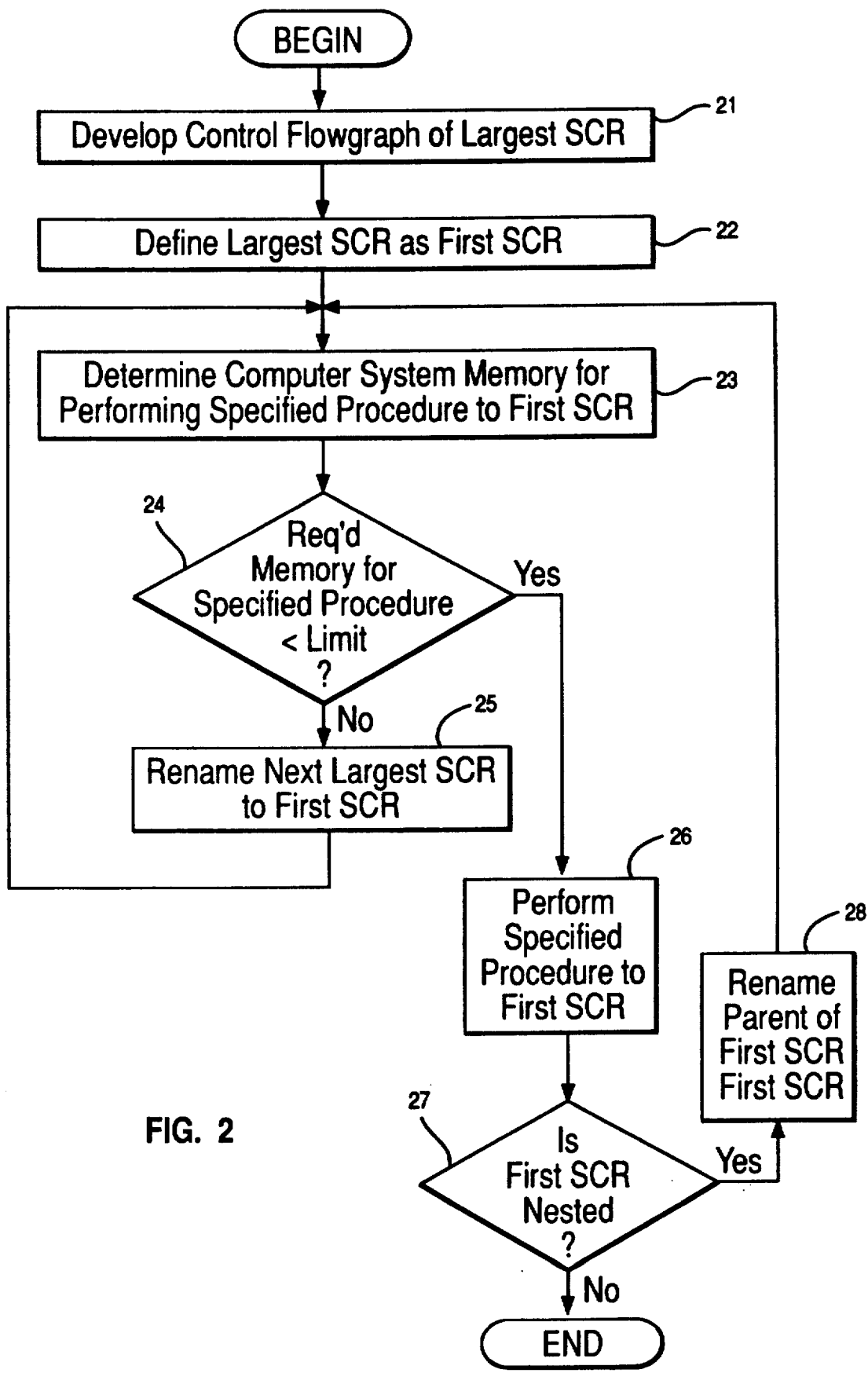
FIG. 2 is a flow chart depicting the operation of the selection of appropriate subgraphs of a program for optimization according to this invention.

The flow chart of FIG. 2 depicts each of the cases described above. The optimization method begins at 21 wherein a flowgraph of the largest strongly connected region is developed. At 22 the largest strongly connected region within this flowgraph (beginning with the entire program as the first defined strongly connected region, as described above) is set to the first SCR. At 23 the amount of computer system memory for performing the specified procedure of optimization to the first SCR is determined. At 24 a test is made to determine if the required memory for performing the specified procedure of optimization to the first SCR is less than the predetermined allowable limit of memory for this procedure. If not, at 25 the next largest SCR is renamed to the first SCR and the operation loops back to 23 to determine if the memory required for performing the specified procedure to this next largest SCR is less than the amount of available memory for this procedure. When an SCR is found so that the amount of required memory for performing the specified procedure is less than that available, at 26 the specified procedure of optimization is performed on that SCR, which had been named the first SCR. After performance of the specified procedure a test is made at 27 to determine if the first SCR is nested within a parent SCR. In not, the optimization process, with respect to the performance of this specified procedure, ends. If so, at 28 the parent SCR is renamed to the first SCR and the operation loops back to 23 to determine if the memory required for performing the specified procedure on this parent SCR is available.

Another example of the best mode of implementing the invention is given by the pseudo-code fragment in Appendix I. The code is adapted from an actual program, which operates as follows: The optimizer gets as input the memory limits which will constrain the optimizations. It resets the maps which are to be created to describe the universe for the sets of entities to be used to solve the dataflow equations for the optimization specified procedure, which here are commoning and code motion. It maps and counts the basic blocks which are contained in the given region, and the number of dictionary entries and different symbolic register uses found in the given region. It computes the size of the arrays used by the specified procedure. It compares this total with the allotted memory, and if the memory requirement exceeds the allotment, then returns the number which corresponds to the region whose nodes were most recently mapped. Else, it finds the regions at the next contained level. If such a region is found then it repeats the steps that were performed previously on the contained region. If the region contains no regions itself, then the optimization searches for the next region at the same level. If there is no region at the same level, then it looks for regions at the next higher level. It repeats ascending through the flowgraph levels until a region is found or else there are no more levels to ascend. If there are no more levels, it reports to the specified procedure that no regions to be optimized are found in the program. Comments within the code also help to illustrate the method of the invention.

The invention may be used on any machine using an intermediate level language in the process of compilation, including Reduced Instruction Set Computers (known generically as RISC computers). It can also be used with a compiler that is in turn used with many different computer systems, by adjusting the memory limits to be utilized by the optimizer. By the same means, the user can obtain varied levels of optimization of the same source program. Because the optimizing occurs at the intermediate language level, it can also be used with optimizing compilers dealing with any high level language, including Fortran, PL/I, Cobol, C, SETL and Pascal. Through the use of the invention, at least partial optimizations can be performed upon very large programs that would be impossible to optimize because of memory constraints in the computer being used to carry out the optimization process. A further advantage of the invention is the alleviation of register pressures which occur when optimizing a large program. For example, when many expressions are moved outside of loops, they exceed the number of registers available to contain them. The code which performs register allocation then requires a great deal of processing time and memory space in trying to accommodate these register requirements and may result in having to put register values into temporary storage to be retrieved later when the values are used. With partitioned optimizations in large programs, code movement of the type just described is restricted to inner sub-regions, and thus a register's assignment is placed closer to its uses. Whilst this may not be the theoretically optimal choice if an expression which is moved to the beginning of an inner loop is also a constant in the outer region or regions, it frequently avoids the wasted processing of having to reverse the effects of a previous optimization which results in poorer code quality.

APPENDIX I

```
commoning_map: proc(scr#) returns(integer);

/***************************************************************/
/*                                                             */
/* Procedure Name: commoning_map                               */
/*                                                             */
/* Function: Build maps of the basic blocks and the used items */
/*           items in the dictionary and the reg table for a   */
/*           specific region.                                  */
/*                                                             */
/* Inputs: scr# - indicates the node in the flow graph where   */
/*         we start looking for a region for which t           */
/*         build the reg_map and dic_map. If start =           */
/*         node_count then we'll try building the maps         */
/*         for the whole program. Otherwise, it means          */
/*         we've already processed this region and we          */
/*         want to find others in the program starting         */
/*         from where we left off.                             */
/*                                                             */
/* Outputs: dic_map, reg_map, map_info, node_map.              */
/*                                                             */
/***************************************************************/ dcl scr=    integer value;
```

```
dcl partcom    bit;

dcl (i,j,k)    integer;

dcl node       integer;

dcl limit      integer;   ! limit for vector sizes for partitioned commoning.

dcl small_limit  literally(2048);    ! 2 k dcl medium_limit literally(1024000); ! 1 meg dcl large_limit  literally(2048000); ! 2 meg if indebug('PC_OFF') ¬ = 0 then   ! if partitioning is turned off partcom = false;                ! then set the flag to false else do;                             ! Otherwise, set the flag to true and partcom = true;               ! choose the correct data space limit.

if indebug('PC_S') ¬ = 0 then ! NOTE: the default is the medium limit.

limit = small_limit;

else if indebug('PC_L') ¬ = 0 then limit = large_limit;

else limit = medium_limit;

end; ! else

! Allocate the arrays used to map the entities which will be collected

! by commoning.

if allocation(dic_map) = 0 then do; ! if dic_map isn't allocated then none of the maps are allocated.

allocate dic_map extents(dic_tab_top);

allocate reg_map extents(last_reg);

allocate unmap_reg extents(last_reg-first_reg+1);

allocate node_map extents (node_count);
```

```
   allocate unmap_node extents (node_count);

end;   ! if allocation(dic_map) = 0

! Find a region small enough to work with...

do while (scr# ¬ = 0);

! Reset the maps for the region next_reg, next_dic = 0;

$zero(dic_map); $zero(reg_map); $zero(unmap_reg);

$zero(node_map); $zero(unmap_node);

! The loop pre_header node maps into position 1 of unmap_bb and
  ! the post_exit node which is always basic block #1 maps into
  ! position 0 which is not explicitly done here since node_map is
  ! zeroed above.

unmap_node(0) = post_exit;

node_map(pre_header) = 1;

unmap_node(1) = pre_header;

node_map(post_exit) = 0;

curr_node = 1;

map_node(scr#);

! Loop thru the instructions in the nodes that have been mapped.

do k = 1 to curr_node;   ! don't need to look at the post_exit node
                           ! since it is a "fictional" node which contains
                           ! no code and is used to simplify optimization
                           ! algorithms.

node = unmap_node(k);
  if scr(node) then iterate;
  else
    do i = each instruction in the basic block "node".
      do j = each operand in the current instruction "i"
        if j is a register and hasn't been mapped yet then...
```

```
            next_reg = next_reg + 1;
            reg_map(j) = next_reg;
            unmap_reg(next_reg) = reg;
          end; ! if j is a register
        else
          if j is a dictionary entry and hasn't been mapped yet then...
            next_dic = next_dic + 1;
            dic_map(j) = next_dic;
          end; ! if j is a dictionary entry
        end do j;
      end do i;
    end do k;
```

! If partitioned commoning is turned off OR ELSE partitioned commoning
! IS being performed and this region ISN'T too big, then perform
! commoning on this region.
if ( ¬ partcom) |* ( ¬ too_big) then
  return (scr#);

! Otherwise, look for another region to map within this region.
do i = each node in the region
  if scr(i) then leave;
end do i;

! If there are no inner regions in scr#, find the next one
! at the same or higher level.
if i > number of nodes in the region "scr#"
  scr# = find_next_region(scr#);
else ! examine the first inner region of "scr#"
  scr# = i;
end; ! do while (scr# ¬ = 0)

! If we reached here, then there are no more regions which can be

! optimized.

return(0);

map_nodes: proc(scr#);

! Recursive procedure to map all the basic block and scr nodes contained

! in the region "scr#".

dcl scr#   integer value;

dcl i      integer;

! Map each node in the region "scr#".

do i = each node in the region

! If this node is itself a strongly connected region, then map its

! nodes first.

if scr(i) then map_nodes(i);

else do; ! Not a strongly connected region (therefore, it's a basic block)

! so go ahead an map it.

curr_node = curr_node + 1;

node_map(i) = curr_node;

unmap_node(curr_node) = i;

end; ! else end do ii;

! After mapping all of its nodes, add the "scr#" node to the

! node_map, too.

curr_node = curr_node + 1;

node_map(scr#) = curr_node;

unmap_node(curr_node) = scr#;

end; ! map_nodes

```
too_big: proc returns (bit);

!--------------------------------------------------------------

! VECTOR      VECTOR DIMENSIONS      SIZE OF A SINGLE VECTOR ELEMENT

!--------------------------------------------------------------

! avail_regs   next_reg x node_count    2 bytes (half a word)

! dead_regs    next_reg x node_count    2 bytes

! avail_dics   next_dic x node_count    2 bytes

! reg_kills    next_reg x next_reg      1 byte (one quarter of a word)

!-------------------------------------------------------------- if ( 2 * (next_reg * node_count * .5) +   ! sizes for avail_regs and dead_regs

1 * (next_dic * node_count * .5) +   ! size for avail_dics

1 * (next_reg * next_reg * .25)      ! size for reg_kills

) > limit then   ! If total amount of memory needed by these return(true);    ! vectors is greater than the limit then return else                ! true because the region is too bit to be commoned.

return(false);   ! Otherwise, return false.

end;  ! too_big find_next_region: proc(regn) returns(integer);

!--------------------------------------------------------------

! This procedure take a region number and finds the next region in the
! flow graph which is at the same or higher level as "regn". The node
! number of that next region will be returned. If there is no such
! region, the value 0 is returned to indicate this.

!-------------------------------------------------------------- dcl regn   integer value;

dcl cr     integer;      ! containing region dcl i      integer;      ! loop counter ! We quit if we are already at the outermost region level.

do while(regn ¬= node_count);

! "cr" is the region which contains "regn"

cr = containing_region(regn);
```

```
! Loop through the remaining siblings in the containing region.

do i = regn + 1 to last node in "cr"

! If there is another region, return its number.

if scr(i) then return(i);

end do i;

! At this point, we have to ascend a level and search the siblings
! of regn's containing region.

regn = cr;

end; ! do while (regn ¬= node_count);

! No more regions to examine...

return(0);

end; ! find_next_region end commoning_map;
```

We claim:

1. A method for operating a compiler program in a computer system, said computer system utilizing said compiler program to execute a specified procedure for improving an intermediate language version of a computer program under development, comprising the steps of:
   a) developing a control flowgraph representing a largest strongly connected region in said program under development;
   b) by examining code sequences in said strongly connected region, determining an amount of memory of said computer system required to perform said specified procedure to said strongly connected region;
   c) comparing said amount of memory determined in step b) to a predetermined computer system memory usage limit to determine if said amount of memory determined in step b) exceeds said predetermined computer system memory usage limit, thereby denoting an incapability of said computer system of applying said specified procedure to said strongly connected region;
   d) if said amount of memory determined in step b) does not exceed said predetermined limit, applying said specified procedure to said strongly connected region examined in step b); otherwise
   e) if said amount of memory determined in step b) exceeds said predetermined limit, executing steps b)–d) to a next largest previously unselected strongly connected region in said control flowgraph.

2. A method as claimed in claim 1, in which said specified procedure is for performing code motion in said intermediate language version of said development computer program.

3. A method as claimed in claim 1, in which said specified procedure is for performing store motion in said intermediate language version of said development computer program.

4. A method as claimed in claim 1, in which said specified procedure is for removing redundant code sequences in said intermediate language version of said development computer program.

5. A method as claimed in claim 1, in which said specified procedure is for removing useless code sequences in said intermediate language version of said development computer program.

6. A method as claimed in claim 1, in which said specified procedure is for simplifying expressions in said intermediate language version of said development computer program.

7. A method for operating a compiler program in a computer system, said computer system utilizing said compiler program to execute a specified procedure for improving an intermediate language version of a computer program under development, comprising the steps of:
- a) developing a control flowgraph representing a largest strongly connected region in said program under development, said largest strongly connected region being a parent strongly connected region and including one or more nested strongly connected regions;
- b) defining said largest strongly connected region as a first strongly connected region;
- c) by examining code sequences in said first strongly connected region, determining an amount of memory of said computer system required to perform said specified procedure to said first strongly connected region;
- d) comparing said amount of memory determined in step c) to a predetermined computer system memory usage limit to determine if said amount of memory determined in step c) is less than said predetermined computer system memory usage limit, thereby denoting a capability of said computer system of applying said specified procedure to said first strongly connected region;
- e) if said amount of memory determined in step c) is less than said predetermined limit, applying said specified procedure to said first strongly connected region examined in step c) and determining if said first strongly connected region is nested within a first parent strongly connected region in said control flowgraph, and if so;
- f) determining if said first strongly connected region is nested within a first parent strongly connected region in said control flowgraph, and if so;
- f) defining said first parent strongly connected region as said first strongly connected region and repeating steps c)–e); and
- g) if said amount of memory determined in step c) is greater than said predetermined limit, defining a next largest previously unselected strongly connected region in said control flowgraph as said first strongly connected region and repeating steps c)–f).

* * * * *

UNITED STATES PATENT AND TRADEMARK OFFICE
CERTIFICATE OF CORRECTION

PATENT NO. : 5,193,190
DATED : Mar. 9, 1993
INVENTOR(S) : Joyce M. Janczyn and Peter W. Markstein It is certified that error appears in the above-indentified patent and that said Letters Patent is hereby corrected as shown below:

Col. 7-8, in the table, sixth line of text, delete "which t" and substitute therefor --which to--;

Col. 15-16, in the table, 17th line of text, delete "ahead an" and substitute therefor --ahead and--;

Col. 22, line 13, delete entire line;
line 14, delete entire line; and
line 15, delete entire line.

Signed and Sealed this

Fifth Day of December, 1995

Attest:

BRUCE LEHMAN

Attesting Officer

Commissioner of Patents and Trademarks